(12) United States Patent
Wang et al.

(10) Patent No.: US 11,983,086 B2
(45) Date of Patent: May 14, 2024

(54) METHOD FOR PROCESSING DATA, AND ELECTRONIC DEVICE, STORAGE MEDIUM AND PROGRAM PRODUCT

(71) Applicant: BEIJING BAIDU NETCOM SCIENCE TECHNOLOGY CO., LTD., Beijing (CN)

(72) Inventors: Haifeng Wang, Beijing (CN); Xiaoguang Hu, Beijing (CN); Dianhai Yu, Beijing (CN); Xiang Lan, Beijing (CN); Yanjun Ma, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/989,644

(22) Filed: Nov. 17, 2022

(65) Prior Publication Data

US 2023/0115163 A1   Apr. 13, 2023

(30) Foreign Application Priority Data

Dec. 31, 2021   (CN) .......................... 202111659099.2

(51) Int. Cl.
*G06F 11/34* (2006.01)
*G06N 3/063* (2023.01)

(52) U.S. Cl.
CPC ......... *G06F 11/3409* (2013.01); *G06N 3/063* (2013.01)

(58) Field of Classification Search
None
See application file for complete search history.

(56) References Cited

U.S. PATENT DOCUMENTS

2015/0033084 A1   1/2015 Sasturkar et al.
2019/0108559 A1*  4/2019 Suto .................... G10L 15/1822
(Continued)

FOREIGN PATENT DOCUMENTS

CN       105787619 A     7/2016
CN       108764487 A    11/2018
(Continued)

OTHER PUBLICATIONS

Hu S-M, Liang D, Yang G-Y, et al. Jittor: a novel deep learning framework with meta-operators and unified graph execution, 2020, Sci China Inf Sci, vol. 63 222103:1-222103:21, https://doi.org/10.1007/s11432-020-3097-4 (Year: 2020).*
(Continued)

*Primary Examiner* — Phyllis A Book
(74) *Attorney, Agent, or Firm* — Osha Bergman Watanabe & Burton LLP

(57) ABSTRACT

The disclosure provides a method for processing data, and an electronic device. The method includes: obtaining first attribute information of input data and second attribute information of a computing device corresponding to the input data; selecting a target operator implementation mode from a plurality of candidate operator implementation modes based on the first attribute information and the second attribute information; determining a plurality of sub-operators included in an operator required for the input data from an operator library based on the target operator implementation mode, to generate the operator; and obtaining an operation result by performing an operation on the input data by the computing device based on the operator.

18 Claims, 11 Drawing Sheets

(56) References Cited

U.S. PATENT DOCUMENTS

| | | | |
|---|---|---|---|
| 2021/0174214 A1* | 6/2021 | Venkatesan | G06N 3/08 |
| 2021/0248136 A1* | 8/2021 | Panuganty | G06N 20/00 |

FOREIGN PATENT DOCUMENTS

| | | | | | |
|---|---|---|---|---|---|
| CN | 110210605 A | | 9/2019 | | |
| CN | 110766147 A | | 2/2020 | | |
| CN | 110956272 A | * | 4/2020 | | G06F 16/9027 |
| CN | 110968404 A | | 4/2020 | | |
| CN | 111210005 A | | 5/2020 | | |
| CN | 111340237 A | | 6/2020 | | |
| CN | 111782402 A | | 10/2020 | | |
| CN | 111783952 A | | 10/2020 | | |
| CN | 111899149 A | | 11/2020 | | |
| CN | 112084210 A | | 12/2020 | | |
| CN | 112200310 A | | 1/2021 | | |
| CN | 112269723 A | | 1/2021 | | |
| CN | 112560985 A | | 3/2021 | | |
| CN | 112860534 A | | 5/2021 | | |
| CN | 112948079 A | | 6/2021 | | |
| CN | 113031966 A | | 6/2021 | | |
| CN | 113065639 A | | 7/2021 | | |
| CN | 113128678 A | | 7/2021 | | |
| CN | 113128702 A | | 7/2021 | | |
| CN | 113159091 A | | 7/2021 | | |
| CN | 113312175 A | | 8/2021 | | |
| CN | 113703741 A | | 11/2021 | | |
| CN | 114492737 A | * | 5/2022 | | G06F 11/302 |
| CN | 115599356 A | * | 1/2023 | | G06F 8/30 |
| WO | 2021057722 A1 | | 4/2021 | | |

OTHER PUBLICATIONS

Office Action issued in Chinese Application No. 202111659099.2 issued Aug. 4, 2022 (34 pages).

Office Action issued in Chinese Application No. 202111659099.2 issued Sep. 28, 2022 (32 pages).

YH. Zhang et al., "Employing intelligence in object-based storage devices to provide attribute-based file access", Science China Information Sciences, Mar. 2013, vol. 56, 032115:1-032115:10 (10 pages).

L. Wu et al., "A computation and data unified compile architecture for deep learning", 2020, Vo. 30, No. 2, pp. 120-125 (6 pages).

Search Report issued for European patent application No. 22208202.6, mailed Apr. 3, 2023 (10 pages).

\* cited by examiner

METHOD FOR PROCESSING DATA, AND ELECTRONIC DEVICE, STORAGE MEDIUM AND PROGRAM PRODUCT

CROSS REFERENCE TO RELATED APPLICATIONS

This application is based on and claims priority to Chinese Patent Application 202111659099.2, filed on Dec. 31, 2021, the entire contents of which are incorporated herein for all purposes.

TECHNICAL FIELD

The disclosure relates to the field of data processing technology, specifically the field of artificial intelligence technologies such as big data, cloud computing and deep learning, and particularly provides a method for processing data, an apparatus for processing data, an electronic device, a storage medium and a program product.

BACKGROUND

Deep learning framework is a basic software tool for research and development of deep learning technologies, for supporting applications and hardware devices, which improves the efficiency of the research and development of deep learning task. The deep learning framework is used to shield hardware differences and provide a unified interface for application development.

However, the deep learning framework contains a large number of operators. In the related art, there is no low-cost operator implementation mode that can improve hardware performance. Therefore, how to improve the hardware performance and reduce the cost while obtaining the operation result accurately has become an urgent problem to be solved.

SUMMARY

Embodiments of the disclosure provide a method for processing data, an apparatus for processing data, an electronic device, a storage medium and a program product.

According to a first aspect of the disclosure, a method for processing data is provided. The method includes: obtaining first attribute information of input data and second attribute information of a computing device corresponding to the input data; selecting a target operator implementation mode from a plurality of candidate operator implementation modes based on the first attribute information and the second attribute information; determining a plurality of sub-operators included in an operator required for the input data from an operator library based on the target operator implementation mode, to generate the operator; and obtaining an operation result by performing an operation on the input data by the computing device based on the operator.

According to a second aspect of the disclosure, an electronic device is provided. The electronic device includes: at least one processor and a memory communicatively coupled to the at least one processor. The memory stores instructions executable by the at least one processor, and when the instructions are executed by the at least one processor, the at least one processor is caused to implement the method for processing data according to the first aspect of the disclosure.

According to a third aspect of the disclosure, a non-transitory computer-readable storage medium having computer instructions stored thereon is provided. The computer instructions are configured to cause a computer to implement the method according to the first aspect of the disclosure.

It should be understood that the content described in this section is not intended to identify key or important features of the embodiments of the disclosure, nor is it intended to limit the scope of the disclosure. Additional features of the disclosure will be easily understood based on the following description.

BRIEF DESCRIPTION OF THE DRAWINGS

The drawings are used to better understand the solution and do not constitute a limitation to the disclosure, in which.

DETAILED DESCRIPTION

The following describes the exemplary embodiments of the disclosure with reference to the accompanying drawings, which includes various details of the embodiments of the disclosure to facilitate understanding, which shall be considered merely exemplary. Therefore, those of ordinary skill in the art should recognize that various changes and modifications can be made to the embodiments described herein without departing from the scope and spirit of the disclosure. For clarity and conciseness, descriptions of well-known functions and structures are omitted in the following description.

Data processing includes processes of data, such as collection, storage, retrieval, processing, change and transmission, with the purpose of extracting and deducing data that is valuable and meaningful to certain users from large amounts of data that may be disorganized and difficult to understand.

Big data or massive data refers to that the amount of data involved is so large that it cannot be captured, managed, processed and collated within a reasonable duration by mainstream software tools for more positive purposes in business decision-making.

Cloud computing, as a type of distributed computing, refers to the use of the network "Cloud" to decompose a large data processing program into an infinite number of small programs, and then process and analyze these small programs through a multi-server system to obtain a result and return the result to the user.

Artificial Intelligence (AI) is a technical science that studies and develops the theory, method, technology and application system for simulating, extending and expanding human intelligence. Currently, AI technology has been widely used due to its advantages of high automation degree, high accuracy and low costs.

Deep Learning (DL) is a new research direction in the field of Machine Learning (ML), to learn internal laws and representation levels of sample data. The information obtained in the learning process is of great help to interpretation of data such as text, images and sounds. The ultimate goal of DL is to enable machines to have an ability to analyze and learn like humans, and have an ability to recognize data such as text, images and sounds. As far as the specific research contents are concerned, DL mainly consists of neural network systems based on convolution operations, i.e., convolutional neural network, and auto encoder based on multilayer neurons. The multi-layer auto encoder is used for pre-training, and then in combination with identification information, the deep belief network of neural network weights is optimized. DL has yielded results in technologies, such as search technology, data mining, machine learning, machine translation, natural language processing, multimedia learning, voice, recommendation and personalization, and other relevant fields.

The method for processing data of the embodiments of the disclosure is described below in combination with the attached drawings.

Figure 1:
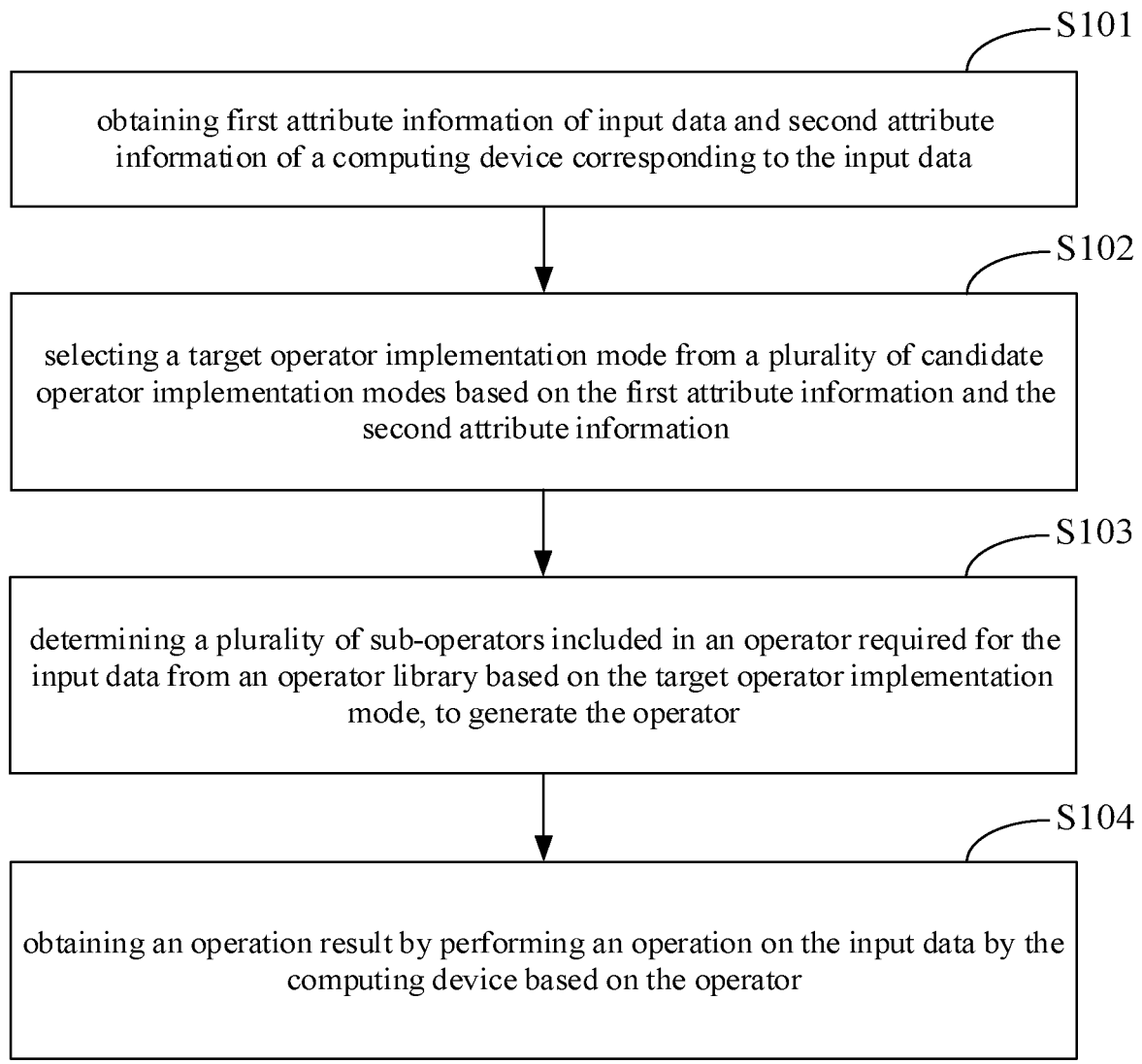
FIG. 1 is a flowchart of a method for processing data according to the first embodiment of the disclosure.

FIG. 1 is a flowchart of a method for processing data according to the first embodiment of the disclosure. It is to be noted that the executive body of the method for processing data of this embodiment is an apparatus for processing data. The apparatus for processing data may specifically be a hardware device, or software in a hardware device. The hardware device is, for example, a terminal device or a server.

As illustrated in FIG. 1, the method for processing data of the disclosure may include the following steps.

At step S101, first attribute information of input data and second attribute information of a computing device corresponding to the input data are obtained.

The operator refers to a mapping from a function space to another function space.

The input data refers to the data that need to be operated, which mainly includes tensor. The tensor may include type of data, shape of data, and storage location of data.

For example, the type of data may be float32, float64, int32 or int64. The shape of data may be big data, small data, wide data or deep data. The storage location of data may be memory of Graphics Processing Unit (GPU), video memory of Deep Computing Unit (DCU) and memory of Application Specific Integrated Circuit (ASIC).

Further, the source of input data may be images, audios and files. The input data may correspond to one or more operator. It should be noted that each operator corresponding to the input data may be generated according to the method provided by the embodiments of the disclosure.

The computing device refers to the device that performs the operation on the input data. For example, the computing device may include a GPU, a Central Processing Unit (CPU), and a specialized AI chip, such as, a Deep Computing Unit (DCU).

It is noted that in the related art, the scheduling rules for the operator implementation modes are simple, and cannot give full play to the performance of the hardware. On the one hand, the shapes and types of the input data are not considered when scheduling the operator implementation modes, and the same operator implementation mode is adopted for different shapes and types, but given different shapes and types of the input data, the performances of different operator implementation modes are different. On the other hand, the specific model of the computing device is not distinguished when scheduling the operator implementation modes. For example, when different operator implementation modes are implemented on different graphics card models, such as V100, A100 and 3090, different performances may be achieved. Moreover, the models of GPU acceleration library (CUDNN) of the computing device are not considered when scheduling the operator implementation modes. For example, for the same operator implementation mode, the performances of different versions of cuDNN may be different. On the yet other hand, the computing environment of the computing device is not considered when scheduling the operator implementation modes. For example, for the same graphic card on the GPU, it may perform differently on different mainboards and CPUs.

Thus, in the disclosure, the information of the scheduling rules of the operator implementation modes (i.e., the first attribute information of the input data and the second attribute information of the computing device) can be obtained for scheduling the operator implementation modes, to give full play to the performance of the hardware.

It should be noted that the first attribute information of the input data may include the shape of the data and the type of the data.

The shape of data may include big, small, wide and deep, namely, big data, small data, wide data and deep data.

The type of the data may include floating-point data and fixed-point data. The size of the floating-point data may be 32 bits or 64 bits. The size of the fixed-point data may be 32 bits or 64 bits.

It is noted that the second attribute information of the computing device may include the model of the computing device, the version of the CPU acceleration library of the computing device, and the environment of the computing device.

At step S102, a target operator implementation mode is selected from a plurality of candidate operator implementation modes based on the first attribute information and the second attribute information.

It should be noted that the candidate operator implementation modes may include two or more operator implementation modes, such as, operator combination implementation mode, and operator compiler implementation mode. The above modes are only examples, and other operator implementation modes may also be candidate operator implementation modes. The operator combination implementation mode is simpler and more flexible because it can be computed using a combination of small operators. The operator compiler implementation mode has a high implementation performance because it can be implemented without increasing the number of operators.

It should be noted that there are preset candidate operator implementation modes in this disclosure, which may be either operator combination implementation mode or operator compiler implementation mode.

The operator combination implementation mode refers to form complex operators by combining smaller operators.

The operator compiler implementation mode also refers to form complex operators by combining smaller operators, but with tuning the smaller operators.

In the disclosure, the first attribute information and the second attribute information can be used to obtain the user's requirement information, and then the target operator implementation mode can be selected from the candidate operator implementation modes. In this way, the operator combination implementation mode and the operator compiler implementation mode exist in the same system. That is, the operator combination implementation mode and the operator compiler implementation mode both exist in the operator library, thereby forming complementary advantages.

At step S103, a plurality of sub-operators included in an operator required for the input data are determined from an operator library based on the target operator implementation mode, to generate the operator.

The operator library is a collection of all operators. The operators in the collection of operators may include complex operators, and may also include sub-operators, in which the sub-operators can be used to generate the complex operators. The collection of operators includes normalized exponential (softmax). The sub-operators may include exponential (exp), summation (sum) and divide.

In an embodiment of the disclosure, after obtaining the target operator implementation mode, the operator (a complex operator) required for input data may be determined from the operator library based on the target operator implementation mode, and then the sub-operators may be obtained based on the operator, to generate the operator based on the sub-operators.

It should be noted that, for the operator combination implementation mode, the sub-operators can be combined to generate the operator.

It should be noted that, for the operator compiler implementation mode, the operator may be split and automatically tuned to generate an execution code, so that the tuned sub-operators may be obtained and the operator may be generated.

For example, the operator may be split and tuned according to the preset tuning rules or tuning templates to generate the execution code, so that the operator may be generated.

It should be noted that based on the first attribute information of the input data, that is, the type of input data, the shape of the data and/or computing requirement, the sub-operators possibly involved in the operator corresponding to the input data may be determined. The sub-operator is an operator involved in the operator library. A piece of input data may correspond to one or more operators.

At step S104, an operation result is obtained by performing an operation on the input data by the computing device based on the operator.

In an embodiment of the disclosure, after the operator is obtained, the operator may be loaded or published to the computing device, so that the computing device may perform the operation on the input data according to the operator to obtain the operation result. It is understood that the computing device can be used as a carrier of the operator, the input data is input into the operator to carry out relevant function operations, to obtain the operation result.

In conclusion, according to the method for processing data of the embodiments of the disclosure, the first attribute information of input data and the second attribute information of the computing device corresponding to the input data are obtained, the target operator implementation mode is selected from the plurality of candidate operator implementation modes based on the first attribute information and the second attribute information, and then the plurality of sub-operators included in the operator required for the input data are determined from the operator library based on the target operator implementation mode, to generate the operator, and finally, the operation result is obtained by performing the operation on the input data by the computing device based on the operator. In embodiments of the disclosure, the automatic scheduling of the operator implementation mode can be carried out based on the first attribute information of the input data and the second attribute information of the operation device, so that for different combinations of the input data and the computing devices, the optimal operator implementation mode can be scheduled, to improve the computing performance of the computing device and the computing efficiency of the input data. Since different operator implementation modes have their own advantages, through the above automatic scheduling strategy, the optimal operator corresponding to the input data can be generated by making full use of each operator implementation mode, and further the hardware performance of the computing device can be fully utilized.

Figure 2:
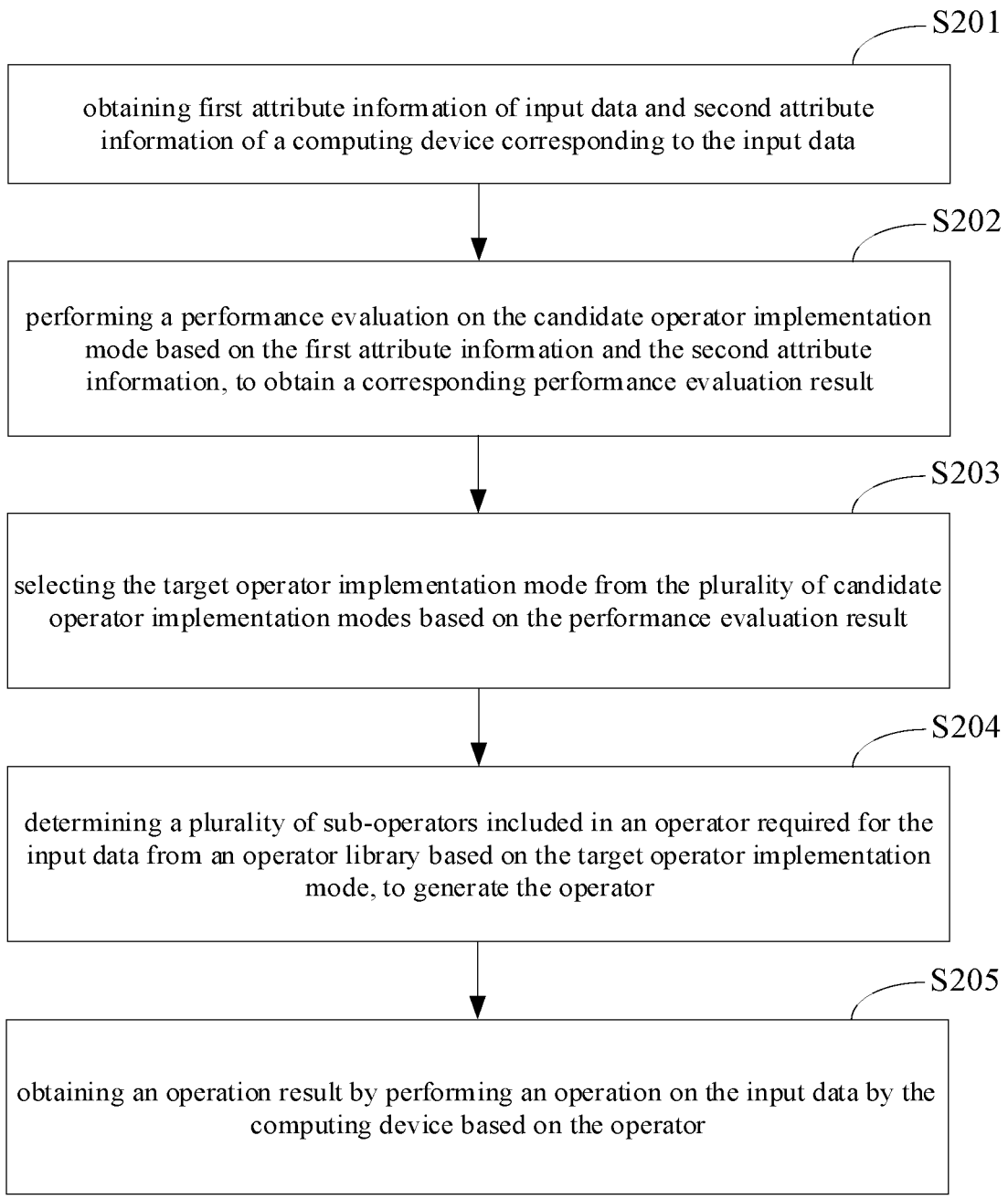
FIG. 2 is a flowchart of a method for processing data according to the second embodiment of the disclosure.

FIG. 2 is a flowchart of a method for processing data according to the second embodiment of the disclosure. As illustrated in FIG. 2, based on the above embodiments, the method for processing data of embodiments of the disclosure may include the following steps.

At step S201, first attribute information of input data and second attribute information of a computing device corresponding to the input data are obtained.

Step S201 may be implemented in any of implementations in various embodiments of the disclosure and will not be repeated here.

At step S202, a performance evaluation is performed on the plurality of candidate operator implementation modes based on the first attribute information and the second attribute information, to obtain corresponding performance evaluation results.

Optionally, the first attribute information and the second attribute information may be input into a performance evaluation model to output the corresponding evaluation results.

It should be noted that the specific way in which the performances of the candidate operator implementation modes are evaluated based on the first attribute information and the second attribute information is not limited in the disclosure, and may be selected according to the actual situation.

At step S203, the target operator implementation mode is selected from the plurality of candidate operator implementation modes based on the performance evaluation results.

It should be noted that there is a one-to-one correspondence between the candidate operator implementation modes and the performance evaluation results. The performance evaluation result may include a plurality of performance indicators, such as the computing time consumption, and the operation resource consumption. Therefore, after obtaining the performance evaluation results, one target operator implementation mode may be selected from the candidate operator implementation modes based on one or more of the performance indicators. For example, in order to obtain the operator implementation mode having the minimum computing time consumption, the performance evaluation result with the minimum computing time consumption may be determined by comparing the computing time consumptions with each other, and then the candidate operator implementation mode corresponding to the performance evaluation result with the minimum computing time consumption is determined as the target operator implementation mode.

At step S204, a plurality of sub-operators included in an operator required for the input data are determined from an operator library based on the target operator implementation mode, to generate the operator.

At step S205, an operation result is obtained by performing an operation on the input data by the computing device based on the operator.

The above steps S204 to S205 may be achieved using any of the implementations in various embodiments of the disclosure and will not be repeated here.

In conclusion, according to the method for processing data of the disclosure, the performance evaluation is performed on the plurality of candidate operator implementation modes based on the first attribute information and the second attribute information, to obtain the corresponding performance evaluation results, and the target operator implementation mode is selected from the plurality of candidate operator implementation modes based on the performance evaluation results. Therefore, the target operator implementation mode can be selected correspondingly for a different performance evaluation result, which reduces the workload of operator development during hardware interfacing while the operator implementation mode can be automatically scheduled, thereby improving the efficiency of obtaining the operator operation result.

Figure 3:
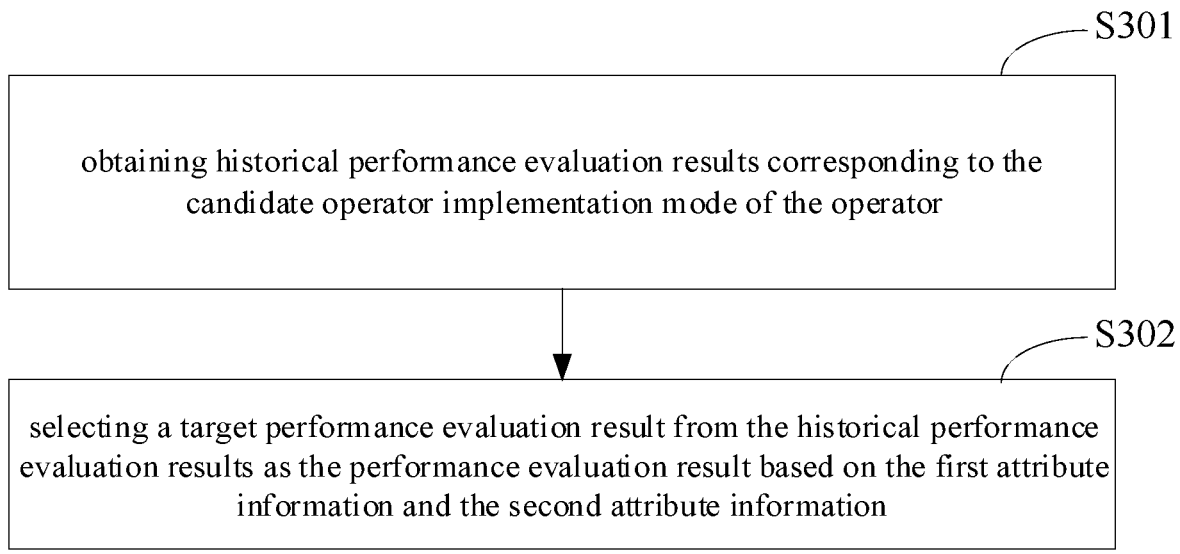
FIG. 3 is a flowchart of a method for processing data according to the third embodiment of the disclosure.

In a possible implementation, as illustrated in FIG. 3, based on the above embodiments, performing the performance evaluation on the plurality of candidate operator implementation modes based on the first attribute information and the second attribute information, to obtain the corresponding performance evaluation results may include the following steps.

At step S301, historical performance evaluation results corresponding to the candidate operator implementation mode of the operator are obtained.

It should be noted that the historical performance evaluation results of the candidate operator implementation mode include the historical performance evaluation results corresponding to the operator combination implementation mode or the historical performance evaluation results corresponding to the operator compiler implementation mode.

It should be noted that after obtaining the operator, the input data and the fixed hardware and software environment, the operator combination implementation mode or the operator compiler implementation mode can be executed, to obtain the historical performance evaluation results corresponding to the candidate operator implementation mode.

The historical performance evaluation result includes a plurality of indicators corresponding to the candidate operator implementation mode and indicator evaluation results.

For example, the historical performance evaluation result includes indicators such as a time indicator, a power indicator, and a video memory indicator. The indicator evaluation results included in the historical performance evaluation result may be time consumption, power consumption, and video memory occupation.

It is noted that the specific way of obtaining the historical performance evaluation results corresponding to the candidate operator implementation modes of the operator is not limited in the disclosure and may be selected according to the actual situation.

Optionally, the historical performance evaluation results may be obtained by querying the cache or querying the server.

Optionally, the historical performance evaluation results may be obtained by theoretical estimation or performance evaluation model prediction.

At step S302, a target performance evaluation result is selected from the historical performance evaluation results as the performance evaluation result based on the first attribute information and the second attribute information.

It should be noted that the historical performance evaluation results correspond to the first attribute information and the second attribute information one-to-one. Therefore, according to the first attribute information and the second attribute information, the target performance evaluation result may be selected from the historical performance evaluation results as the performance evaluation result.

It should be noted that there is no restriction on how to select the target performance evaluation result from the historical performance evaluation results as the performance evaluation result, and the selection may be made according to the actual situation.

Optionally, the target performance evaluation result may be selected from the historical performance evaluation results as the performance evaluation result according to the actual needs of the user. For example, if the user's requirement is short time consumption, the performance evaluation result with the shortest time consumption may be selected from the historical performance evaluation results as the performance evaluation result. For example, if the user's requirement is low power consumption, the performance evaluation result with the minimum power consumption may be selected from the historical performance evaluation results as the performance evaluation result.

In conclusion, according to the method for processing data proposed in this disclosure, the historical performance evaluation results corresponding to the candidate operator implementation mode of the operator may be obtained, and according to the first attribute information and the second attribute information, the target performance evaluation result is selected from the historical performance evaluation results as the performance evaluation result. Therefore, the first attribute information and the second attribute information can be used to select the performance evaluation result, which improves the accuracy and reliability of the obtained performance evaluation result.

Furthermore, after the historical performance evaluation results are obtained, the target performance evaluation result can be selected from the historical performance evaluation results as the performance evaluation result, so that the performance evaluation result is obtained.

Figure 4:
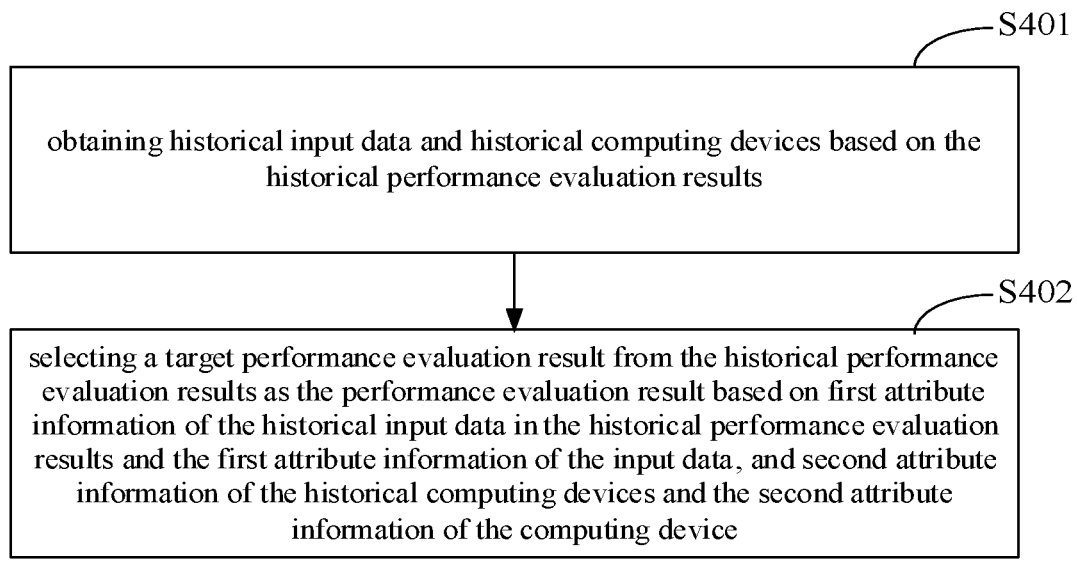
FIG. 4 is a flowchart of a method for processing data according to the fourth embodiment of the disclosure.

In a possible implementation, as shown in FIG. 4, based on the above embodiments, the method includes the following steps.

At step S401, historical input data and historical computing devices are obtained based on the historical performance evaluation results.

It should be noted that information on the historical input data and historical computing devices are recorded in the historical performance evaluation results. In this embodiment, based on the recorded information in the historical performance evaluation results, the historical input data and the historical computing devices corresponding to the historical performance evaluation results can be determined.

At step S402, a target performance evaluation result is selected from the historical performance evaluation results as the performance evaluation result based on first attribute information of the historical input data in the historical performance evaluation results and the first attribute information of the input data, and second attribute information of the historical computing devices and the second attribute information of the computing device.

In this embodiment, in order to reduce the workload of obtaining the performance evaluation result, the target performance evaluation result is selected from the historical performance evaluation results as the performance evaluation result based on the first attribute information of the historical input data in the historical performance evaluation results and the first attribute information of the input data, and the second attribute information of the historical computing devices and the second attribute information of the computing device.

In a possible implementation, the first attribute information of the historical input data is compared with the first attribute information of the input data to determine whether there is historical input data having the attribute information consistent with the current input data. Furthermore, the second attribute information of the historical computing devices is compared with the second attribute information of the computing device to determine whether there is a historical computing device having the attribute information consistent with the current computing device.

In this embodiment, the target performance evaluation result that is consistent with the first attribute information of the input data and the second attribute information of the computing device is selected from the historical performance evaluation results as the performance evaluation result.

It should be noted that, when the first attribute information of the historical input data is consistent with the first attribute information of the current input data, and the second attribute information of the historical computing device is consistent with the second attribute information of the current computing device, it is indicated that similar input data has been processed by a similar computing device, then the corresponding historical performance evaluation result can be directly determined as the performance evaluation result.

Furthermore, after the target performance evaluation result is determined, the candidate operator implementation mode corresponding to the target performance evaluation result may be determined as the target operator implementation mode.

For example, if the first attribute information of the historical input data of operator A is a1, the second attribute information of the historical computing device is a2, and the historical evaluation result is a3, then when the first attribute information of operator B is consistent with a1, the second attribute information of operator B is consistent with a2, the performance evaluation result of operator B is a3. For example, the candidate operator implementation mode corresponding to the performance evaluation result a3 is an operator combination implementation mode, then the operator combination implementation mode adopted by a3 can be directly determined as the target operator implementation mode. Optionally, in response to the historical performance evaluation results not including the target performance evaluation result, that is, there is no historical input data that is consistent with the first attribute information of the current input data, and/or there is no historical computing device that is consistent with the second attribute information of the current computing device, the loss information of the candidate operator implementation modes is obtained based on the first attribute information, the second attribute information and the operator required for the input data, and the performance evaluation results of the candidate operator implementation modes are generated based on the loss information.

Optionally, a performance evaluation model may be built in advance and trained, then the first attribute information, the second attribute information and the operator required for the input data may be input into the performance evaluation model, so that the performance evaluation results of the candidate operator implementation modes may be output.

Furthermore, after generating the performance evaluation results of the candidate operator implementation modes, the target operator implementation mode is output from the candidate operator implementation modes based on the performance evaluation result.

Since the output performance evaluation result does not have a corresponding historical performance evaluation result, in an embodiment, after obtaining the performance evaluation result, the performance evaluation result of the determined target operator implementation mode may be bonded with the first attribute information of the current input data and the second attribute information of the current computing device and stored as a new historical performance evaluation result, to update the database, which improves the integrality of the database, and improves the scheduling efficiency of the operator implementation modes.

In conclusion, according to the method for processing data of this embodiment, the performance evaluation result can be obtained in various ways. Optionally, when in the historical performance evaluation results, there is one result whose first attribute information of the historical input data is consistent with the first attribute information of the input data, and second attribute information of the historical computing device is consistent with the second attribute information of the computing device, the performance evaluation result can be obtained directly. Optionally, when the historical performance evaluation results do not include the target performance evaluation result, the loss information of the candidate operator implementation mode may be obtained, the performance evaluation result of the candidate operator implementation mode is generated based on the loss information, and the performance evaluation result is stored as a new historical performance evaluation result. Therefore, in the disclosure, the performance evaluation results can be obtained in various ways, which improves the accuracy and reliability of the performance evaluation results. Further, the operator implementation mode can be selected based on the performance evaluation results. This further reduces the workload of operator development.

Figure 5:
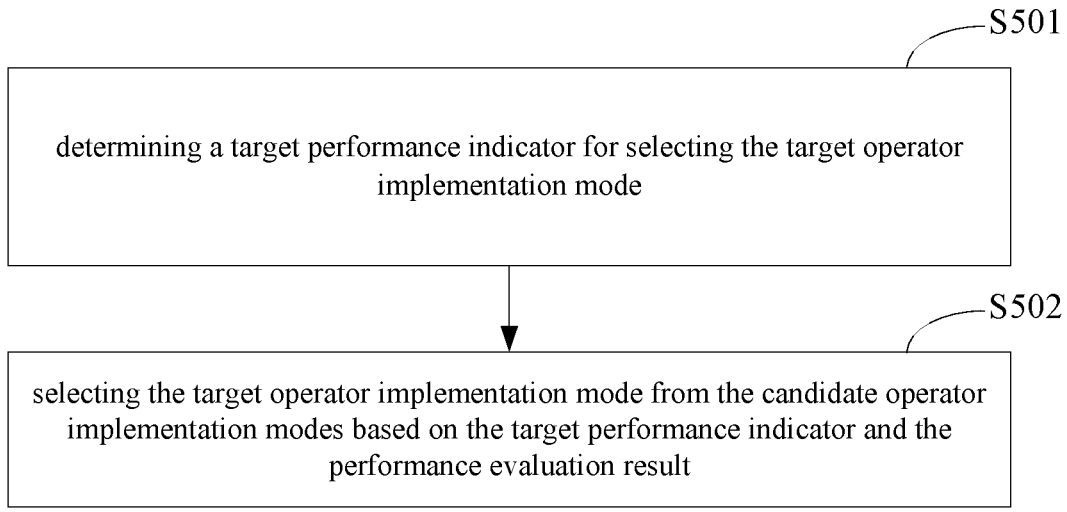
FIG. 5 is a flowchart of a method for processing data according to the fifth embodiment of the disclosure.

In a possible implementation, as shown in FIG. 5, based on the above embodiments, the specific process of selecting the target operator implementation mode from the plurality of candidate operator implementation modes based on the performance evaluation results includes the following steps.

At step S501, a target performance indicator for selecting the target operator implementation mode is determined.

It is to be noted that the target performance indicator may be at least one of power consumption, video memory occupation and time consumption. Based on the computing requirement of the data, the target performance indicator may be identified from multiple performance indicators.

At step S502, the target operator implementation mode is selected from the candidate operator implementation modes based on the target performance indicator and the performance evaluation results.

In an embodiment, the performance evaluation result includes evaluation results of one or more performance indicators. After obtaining the target performance indicator, indicator evaluation results of the target performance indicator in the performance evaluation results may be determined, and based on the indicator evaluation results of the target performance indicator, the target operator implementation mode may be selected from the candidate operator implementation modes. For example, if the target performance indicator is time consumption, the candidate operator implementation mode corresponding to the performance evaluation result with the minimum time consumption in the indicator evaluation results may be selected as the target operator implementation mode. For another example, if the target performance indicator is video memory occupation, the candidate operator implementation mode corresponding to the performance evaluation result with the smallest video memory occupation may be determined as the target operator implementation mode. For example, for candidate operator implementation mode A and candidate operator implementation mode B, the performance evaluation result of candidate operator implementation mode B does not include the target performance indicator, and the performance evaluation result of candidate operator implementation mode A includes the target performance indicator, then the candidate operator implementation mode A may be directly selected as the target operator implementation mode.

Figure 6:
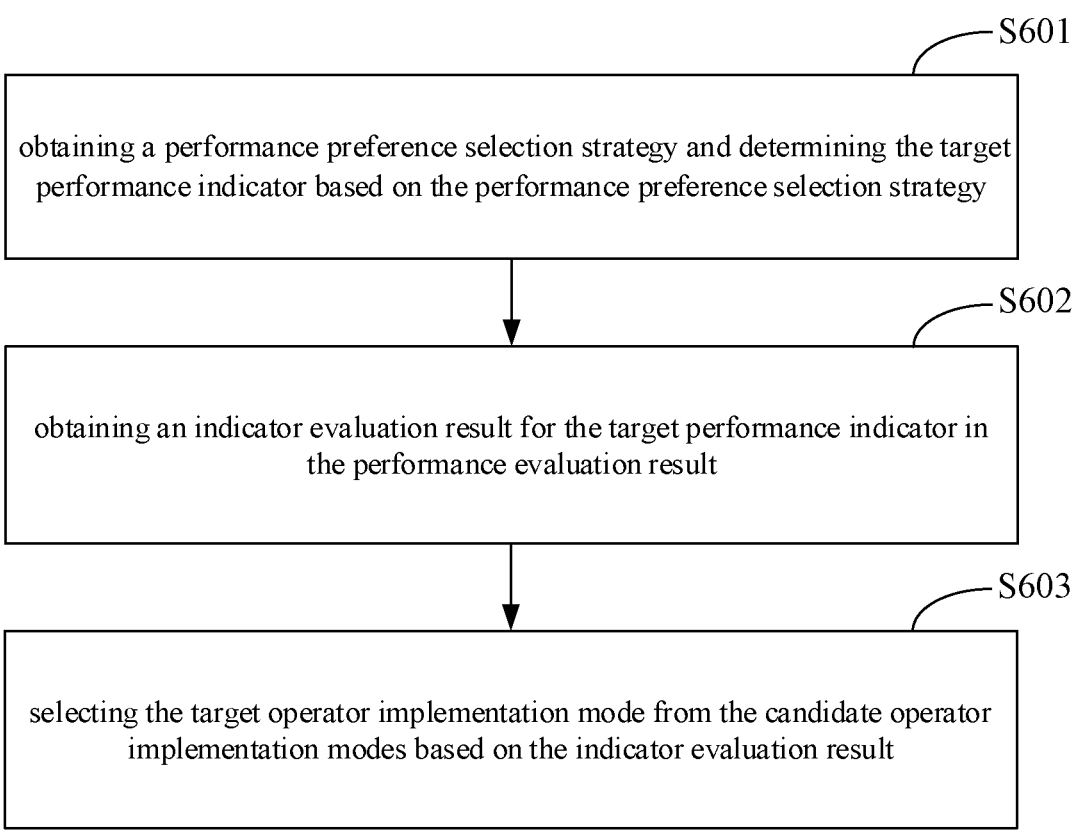
FIG. 6 is a flowchart of a method for processing data according to the sixth embodiment of the disclosure.

In a possible implementation, as shown in FIG. 6, based on the above embodiments, the specific process of selecting the target operator implementation mode from the plurality of candidate operator implementation modes based on the target performance indicator and the performance evaluation results includes the following steps.

At step S601, a performance preference selection strategy is obtained and the target performance indicator is determined based on the performance preference selection strategy.

It is to be noted that the performance preference selection strategy refers to the strategy of selecting the target operator implementation mode according to the operation requirement.

Furthermore, after the performance preference selection strategy is obtained, one or more target performance indicators for selecting the performance evaluation result can be determined according to the performance preference selection strategy.

At step S602, indicator evaluation results for the target performance indicator are obtained from the performance evaluation results.

In an embodiment, the performance evaluation result includes results of one or more performance indicators, for example, one or more of power consumption, video memory occupation and time consumption. After the target performance indicator is obtained, the indicator evaluation results matching the target performance indicator can be determined from the performance evaluation results.

For example, if the target indicator is power consumption, the evaluation results for power consumption indicator can be selected from the performance evaluation results.

At step S603, the target operator implementation mode is selected from the candidate operator implementation modes based on the indicator evaluation results.

In an embodiment, the target operator implementation mode can be selected from the candidate operator implementation modes according to the indicator evaluation results after the indicator evaluation results are obtained.

For example, if the performance preference strategy is power consumption, when the power consumption of the operator combination implementation mode is less than that of the operator compiler implementation mode, the operator combination implementation mode is determined as the target implementation mode even if the time consumption of the operator combination implementation mode is greater than that of the operator compiler implementation mode.

In conclusion, according to the method of processing data of the disclosure, the performance preference selection strategy is obtained, and the target performance indicator is determined based on the performance preference selection strategy, and the indicator evaluation results for the target performance indicator are selected in the performance evaluation results, and then the target operator implementation mode is selected from the candidate operator implementation modes based on the indicator evaluation results. Therefore, the performance preference selection strategy can be obtained in advance according to the operation requirement, and the target operator implementation mode can be selected according to the indicator evaluation results, and the operator implementation modes can be uniformly scheduled, which makes the operator implementation process have the advantages of lower power consumption, less time consumption and less resource consumption.

Figure 7:
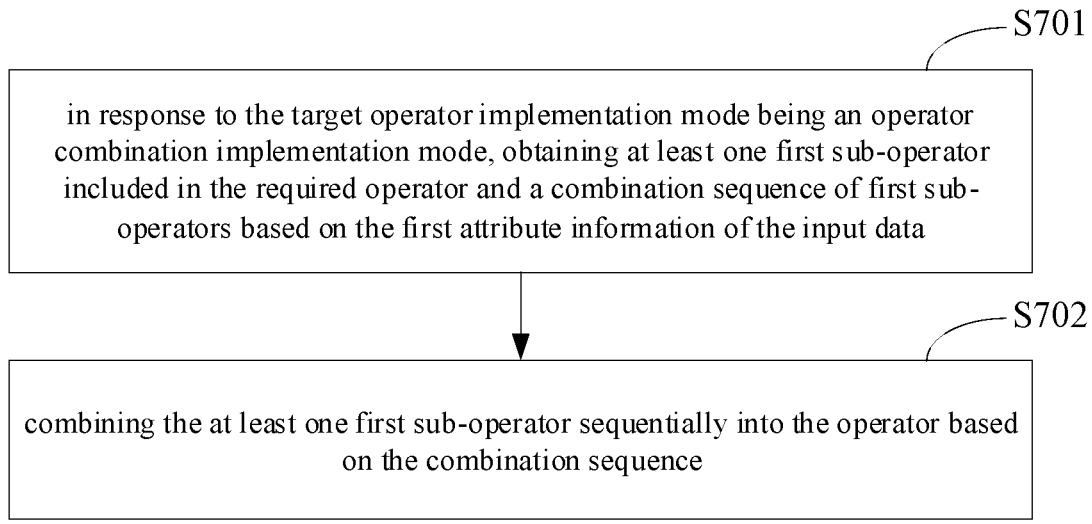
FIG. 7 is a flowchart of a method for processing data according to the seventh embodiment of the disclosure.
Figure 8:
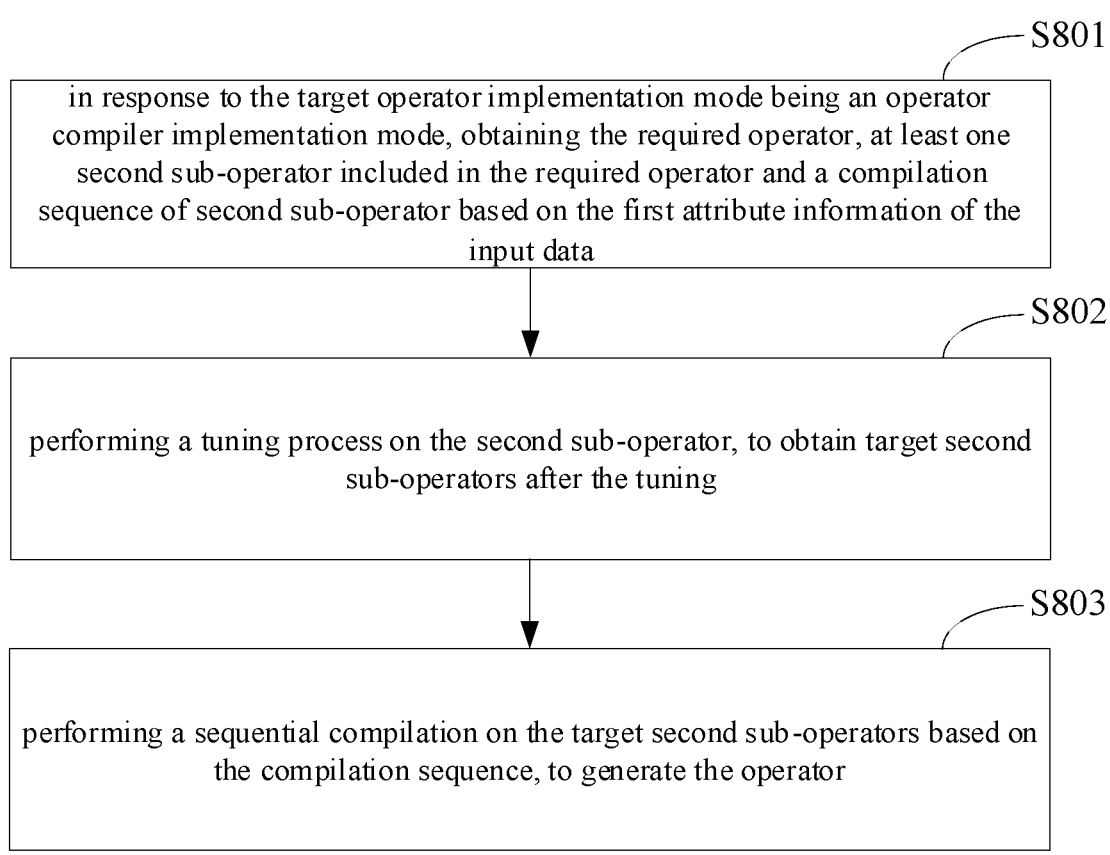
FIG. 8 is a flowchart of a method for processing data according to the eighth embodiment of the disclosure.

In a possible implementation, as shown in FIG. 7, based on the above embodiments, the process of generating the operator based on the sub-operators included in the operator required for the input data includes the following steps.

The examples of the target operator implementation mode as the operator combination implementation mode or the operator compiler implementation mode are descried below respectively.

In the following example, the target operator implementation mode is the operator combination implementation mode.

A step S701, in response to the target operator implementation mode being the operator combination implementation mode, at least one first sub-operator included in the required operator and a combination sequence of the first sub-operators are obtained based on the first attribute information of the input data.

It is to be noted that the operator combination implementation mode refers to combine sub-operators in a certain combination sequence to generate a complex operator.

The attribute information of different input data is often different, and different attribute information can reflect the operation requirement of the input data, and then the operator corresponding to the input data can be determined. In an embodiment, the operation requirement of the input data can be determined based on the first attribute information of the input data, and an operator of the input data can be determined based on the operation requirement. After acquiring the operator, the first sub-operators included in the operator and the combination sequence of first sub-operators can be determined based on the operator combination implementation mode.

For example, for operator A, the first sub-operators obtained are sub-operator 1, sub-operator 2, sub-operator 3, sub-operator 4 and sub-operator 5, and the combination sequence of the obtained first sub-operators is: sub-operator 4, sub-operator 5, sub-operator 2, sub-operator 3 and sub-operator 1.

A step S702, the at least one first sub-operator are combined sequentially into the operator based on the combination sequence.

In this embodiment, the target operator implementation mode is the operator combination implementation mode, then the first sub-operators can be sequentially combined based on the combination sequence to obtain the operator corresponding to the input data.

In conclusion, according to the method for processing data of this embodiment, in response to the target operator implementation mode being the operator combination implementation mode, the at least one first sub-operator included in the required operator and the combination sequence of the first sub-operators are obtained based on the first attribute information of the input data, and the first sub-operators are combined sequentially into the operator based on the combination sequence. Thus, in the disclosure, the sub-operators can be combined sequentially to generate the operator corresponding to the input data, thereby reducing the hardware docking work level.

After the operator corresponding to the input data is obtained, when the computing device operates on the input data according to the operator, it needs to execute the first sub-operators included in the operator according to the combination sequence, i.e., sub-operator 4, sub-operator 5, sub-operator 2, sub-operator 3, and sub-operator 1, to output the final operation result.

In the following example, the target operator implementation mode is the operator compiler implementation mode.

At step S801, in response to the target operator implementation mode being the operator compiler implementation mode, the required operator, at least one second sub-operator included in the required operator and a compilation sequence of the second sub-operators are obtained based on the first attribute information of the input data.

It is to be noted that the operator compiler implementation mode refers to compile the sub-operators according to a certain compilation sequence, to generate a complex operator.

The attribute information of different input data is often different, and different attribute information can reflect the operation requirement of the input data, and then the operator corresponding to the input data can be determined. In an embodiment, the operation requirement of the input data can be determined based on the first attribute information of the input data, and an operator of the input data can be determined based on the operation requirement. After obtaining the operator, the second sub-operators included in the operator and the compilation sequence of the second sub-operators can be determined based on the operator compiler implementation mode.

For example, for operator B, the second sub-operators obtained are sub-operator 6, sub-operator 7, sub-operator 8, sub-operator 9, and sub-operator 10, and the compilation sequence of obtained second sub-operators is: sub-operator 9, sub-operator 10, sub-operator 7, sub-operator 6, and sub-operator 8.

At step S802, a tuning process is performed on the at least one second sub-operator, to obtain target second sub-operators after the tuning.

In a possible implementation, a target tuning strategy is obtained. The target tuning strategy includes a fusion strategy for the second sub-operators, and further, all the second sub-operators are tuned according to the target tuning strategy.

Optionally, the data shape of the input data may be determined according to the first attribute information, and the corresponding target tuning strategy can be obtained according to the data shape.

In the disclosure, the specific way of determining the data shape of the input data according to the first attribute information is not limited and can be selected according to the actual situation.

Optionally, for the input data input1, the mapping relation between the input data input1 and the first attribute information may be queried to determine the shape of the input data.

In this embodiment, after obtaining the data shape, a corresponding target tuning strategy can be obtained. For example, the operators may be compiled and optimized into an overall device-executable code.

Further, after the target tuning strategy is obtained, all the second sub-operators can be tuned.

It is to be noted that in this disclosure, there is no restriction on the specific process of tuning all the second sub-operators, which can be selected according to the actual situation.

Optionally, all the second sub-operators may be tuned automatically or manually, that is, all the second sub-operators may be tuned according to a pre-set tuning rule or tuning template, to obtain the target second operators after tuning.

Optionally, the target tuning strategy may include the fusion strategy for the second sub-operators, so that all the second sub-operators can be fused. Further, after obtaining the corresponding target tuning strategy, the fused sub-operator can be obtained by fusing all the second sub-operators according to the target tuning strategy.

Furthermore, operator grouping and operator scheduling are performed on the fused sub-operator to obtain the target second sub-operators.

It is to be noted that after the fused second operator is obtained, the target second sub-operators may be obtained by grouping and operator scheduling according to the shape of the input data and the operating device corresponding to the second operator.

At step S803, a sequential compilation is performed on the target second sub-operators based on the compilation sequence, to generate the operator corresponding to the input data.

In conclusion, according to the method for processing data of the disclosure, the operator combination implementation mode or the operator compiler implementation mode is selected according to the performance preference selection strategy, and according to the operator combination implementation mode or the operator compiler implementation mode, the operation is performed on the input data by the operating device according to the operator. Therefore, the target second sub-operators can be compiled sequentially based on the compilation sequence of target second sub-operators, to generate the operator corresponding to the input data, which can avoid the overhead of the operator starting the device to execute the command.

Further, after the operator is obtained, the computing device can carry on the operation to the input data according to the operator and obtain the operation result.

Figure 9:
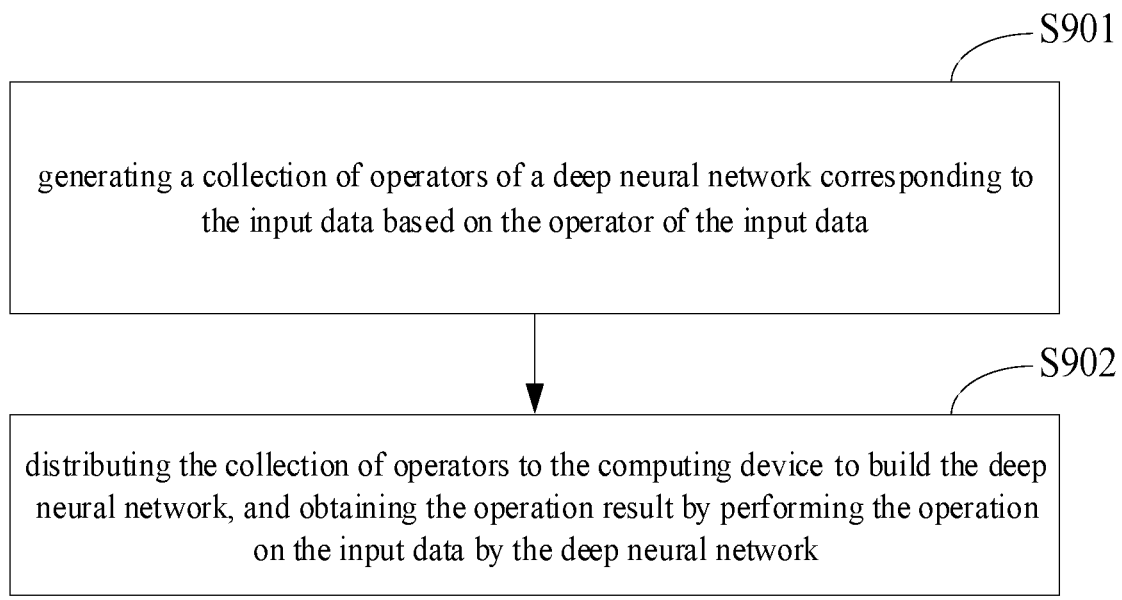
FIG. 9 is a flowchart of a method for processing data according to the ninth embodiment of the disclosure.

In a possible implementation, as shown in FIG. 9, on the basis of the above embodiments, the specific process of obtaining the operation result by performing the operation on the input data by the computing device based on the operator includes the following steps.

At step S901, a collection of operators of a deep neural network corresponding to the input data is generated based on the operator of the input data.

Deep Neural Networks (DNN) is a technique in the field of ML.

It is to be noted that after receiving a data processing task, the input data can be extracted from the data processing task. For the diversity of the data processing task, the input data also has diversity, the operator corresponding to the input data may be various, so the collection of operators of the DNN corresponding to the input data is generated based on the operator of the input data.

At step S902, the collection of operators is distributed to the computing device to build the DNN, and the operation result is obtained by performing the operation on the input data by the DNN.

In an embodiment, after generating the collection of operators of the DNN corresponding to the input data, the collection of operators can be distributed to the computing device to build the DNN.

For example, the input data may be image data, and local convolution-normalization-nonlinearized network (Conv-IN-Relu) may be built; the input data may be audio data, and Wavelet Neural Network (WNN) may be built; the input data may be text data, and Convolutional Recurrent Neural Network (CRNN) may be built.

Furthermore, after building the DNN, the input data can be operated by the DNN to obtain the operation result. Different DNNs can obtain different operation results by calculating the input data. For example, when the input data is image data, the DNN may be built as a neural network for object detection and image segmentation. Correspondingly, the operation result may be output target detection box, image segmentation result, and detected target type. For another example, the input data is audio data, and the DNN built may be the neural network used for speaker type recognition, audio recognition or the like. Correspondingly, the operation result may be the type of speaker, and text corresponding to the audio. For yet another example, the input data may be text data, and the DNN built may be the text extraction network and text generation network. Correspondingly, the operation result may be extracted entity information and articles generated based on the input data.

Meanwhile, in order to improve the efficiency and accuracy of the operation process, the operation process is monitored, and the operation is stopped and an error log is generated in response to detecting abnormality during the operation. The error log may be used to reschedule the operator.

Optionally, when abnormality occurs in the operation process, a new first computing device may be scheduled based on the second attribute information of the computing device, and the input data may be operated by the new first computing device according to the operator, to obtain the operation result.

Optionally, when abnormality occurs in the operation process, a new second computing device may be scheduled based on the first attribute information of the input data, and the second attribute information of the second computing device may be obtained. According to the first attribute information and the second attribute information, the target operator implementation mode is selected from the candidate operator implementation modes and the following steps are executed.

In conclusion, according to the method for processing data of the embodiment, the collection of operators of the DNN corresponding to the input data is generated based on the operator of the input data, and the collection of operators is distributed to the computing device to build the DNN, and the operation result is obtained by performing the operation on the input data by the DNN. Meanwhile, the operation can be monitored, and in response to detecting abnormality during the operation, the new first computing device can operate on the input data according to the operator to obtain the operation result, or the new second computing device can be scheduled based on the first attribute information of the input data. Therefore, the DNN can be generated on the computing device, and the input data can be calculated to obtain the operation result, which can improve the efficiency and accuracy of the operation process of the input data.

The following is an explanation of the proposed data processing framework.

Figure 10:
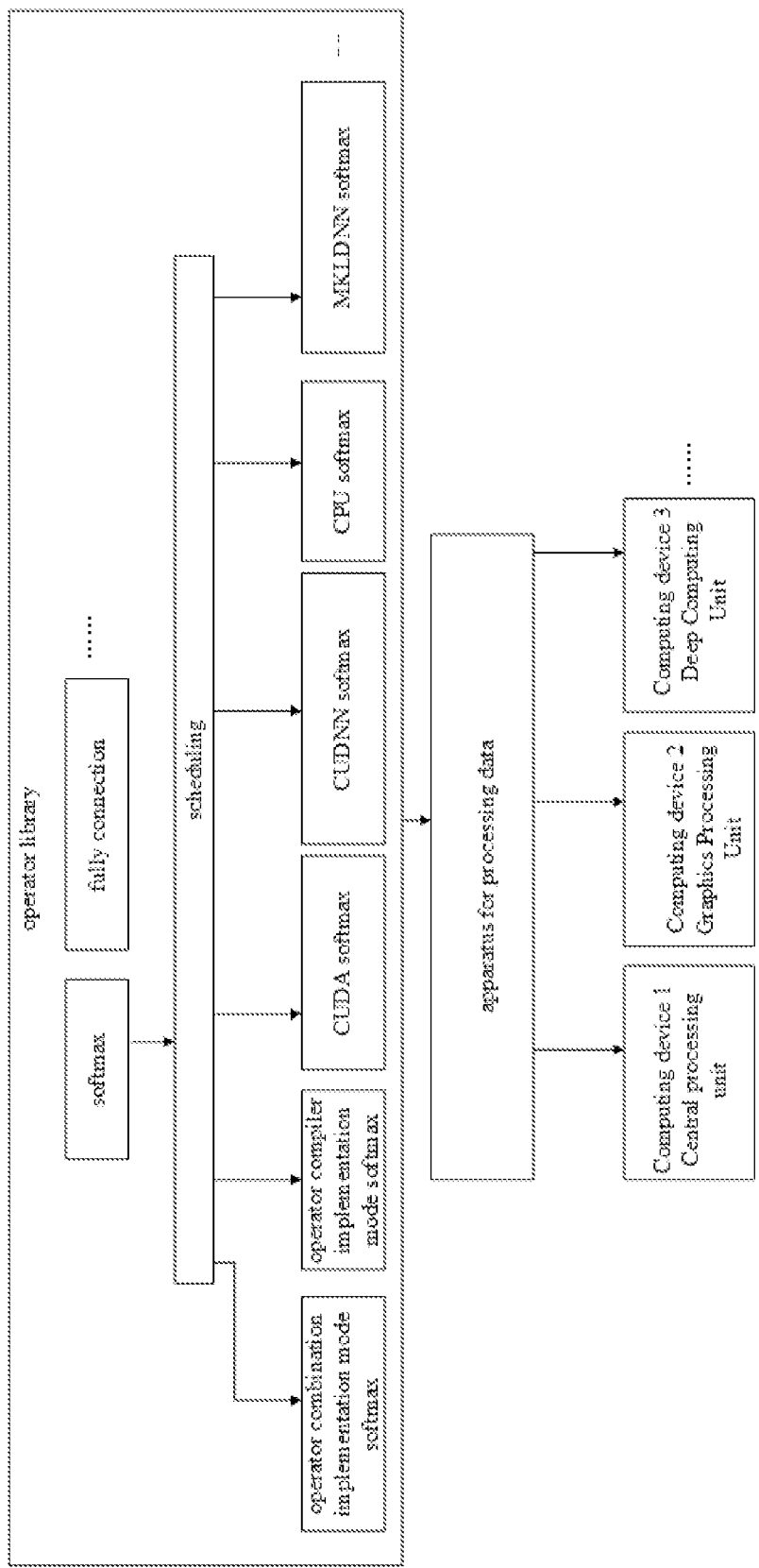
FIG. 10 is a schematic diagram of a data processing framework according to the disclosure.

As shown in FIG. 10, the data processing framework in the disclosure includes an apparatus for processing data. The apparatus for processing data can perform the method for processing data in above embodiments, that is, schedule one target operator implementation mode from an operator implementation mode library according to the first attribute information of the input data and the second attribute information of the computing device, in which the operator implementation mode library includes at least the operator combination implementation mode and the operator compiler implementation mode, and for any operator corresponding to the input data, the scheduled target operator implementation mode is one of the operator combination implementation mode and the operator compiler implementation mode. The corresponding operator of the input data includes a plurality of sub-operators. The sub-operators corresponding to the operator need to be selected from the operator library and then processed according to the target operator implementation mode, to generate the operator corresponding to the input data. Further, after the operator implementation mode is obtained, the operator implementation mode can be loaded into the computing device, so that the computing device performs the operation on the input data according to the operator.

The following is an explanation of the process of the method for processing data presented in this disclosure.

Figure 11:
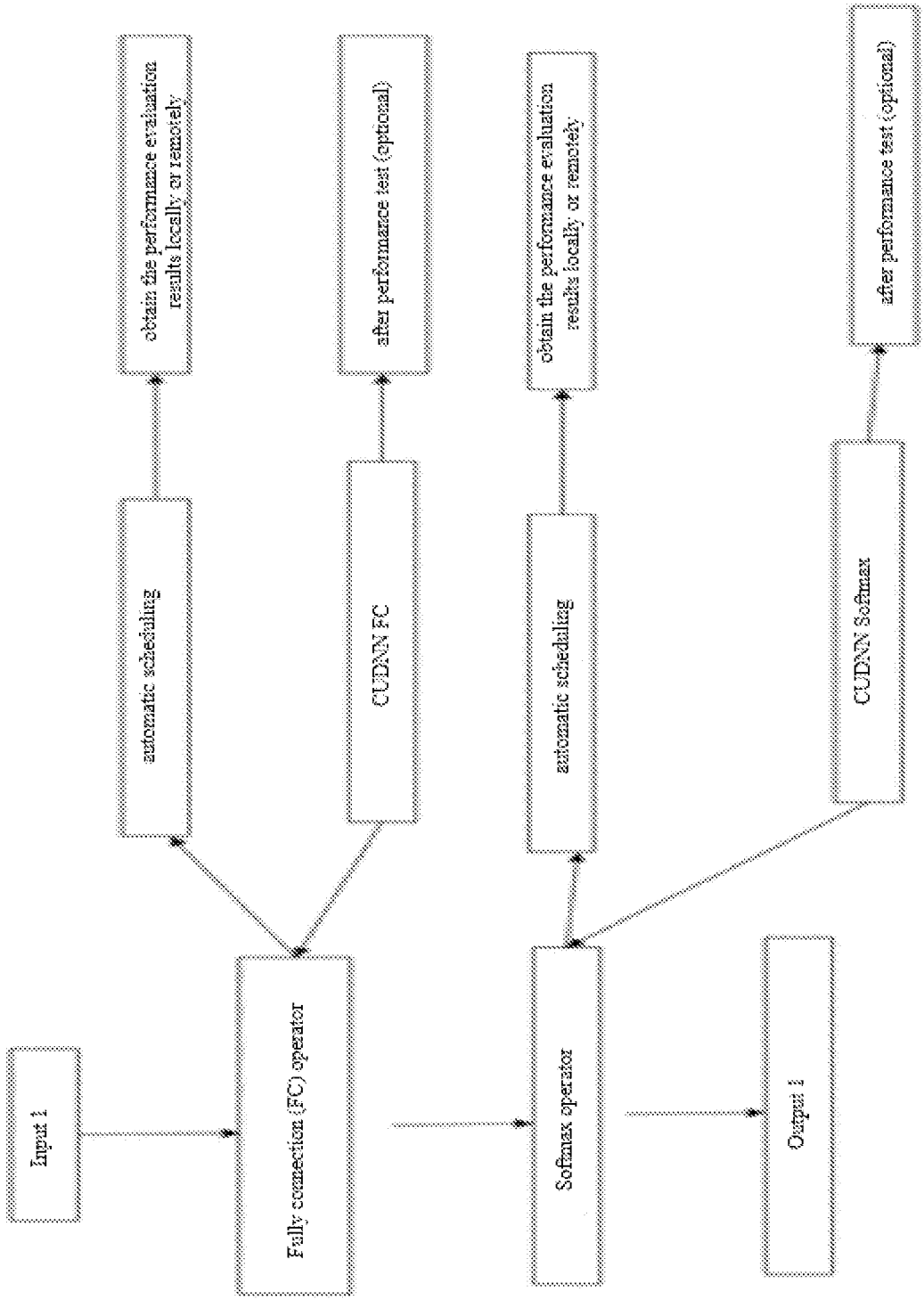
FIG. 11 is a schematic diagram of application of a method for processing data according to the disclosure.

As shown in FIG. 11, when the input data is input1, the accelerator library version of the computing device is selected as CUDNN, where the corresponding operators of input1 include a fully connection (FC) operator and a normalization (Softmax) operator. The performance test result can be obtained locally or remotely. When the performance test result is optional, the target operator implementation mode is directly scheduled, and then the FC operator and Softmax operator are generated, and the computing device outputs the operation result output1 on the input1 according to these two operators.

Figure 12:
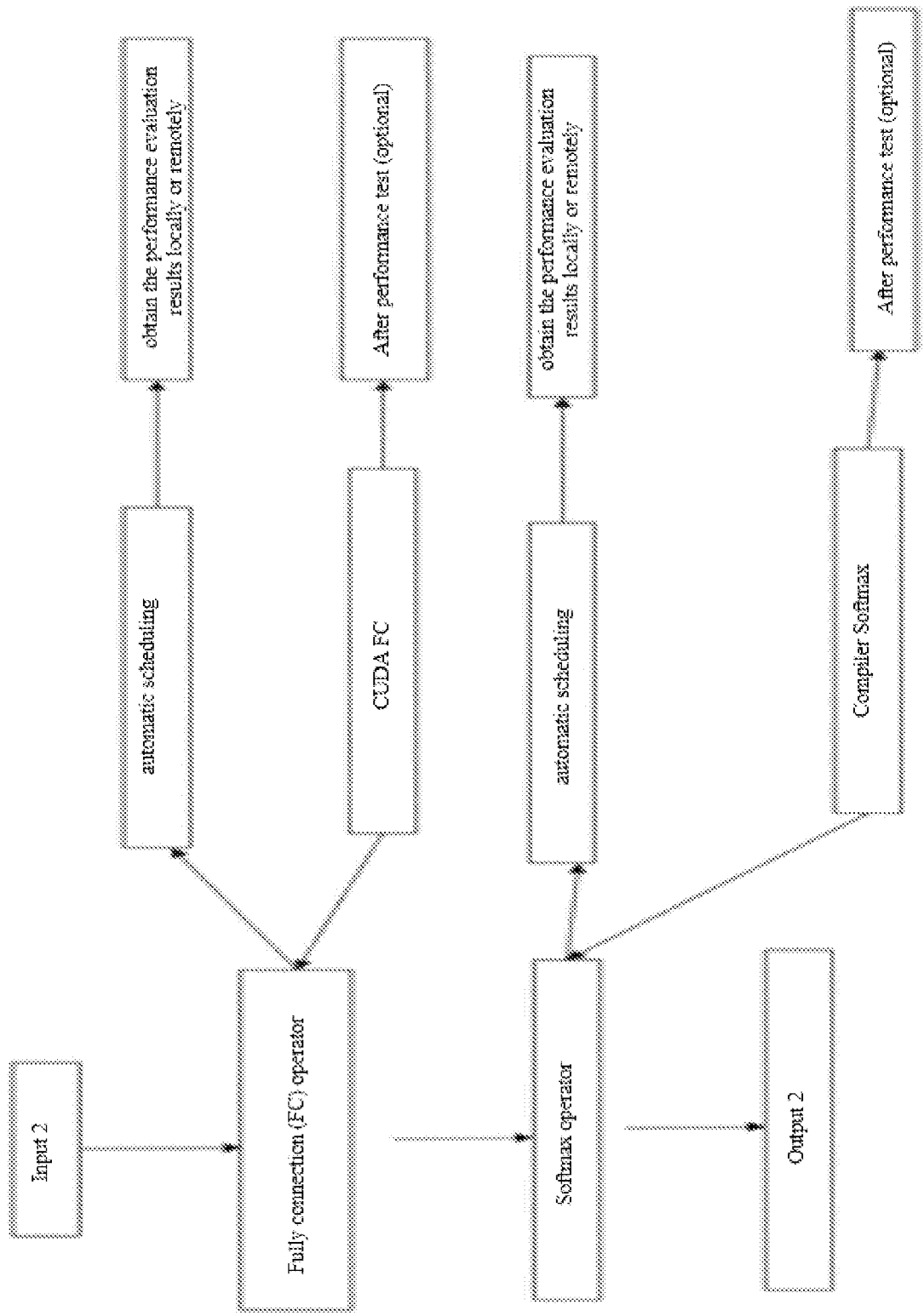
FIG. 12 is a schematic diagram of application of a method for processing data according to the disclosure.

As shown in FIG. 12, when the input data is input2, and the data shape of input2 is different from that of input1, the operator implementation mode needs to be re-scheduled. The accelerator library version of the computing device is selected CUDA. The corresponding operators of input2 include a FC operator and a Softmax operator. The performance test result can be obtained locally or remotely. When the performance test result is optional, the computing device outputs the operation result output2 directly.

Figure 13:
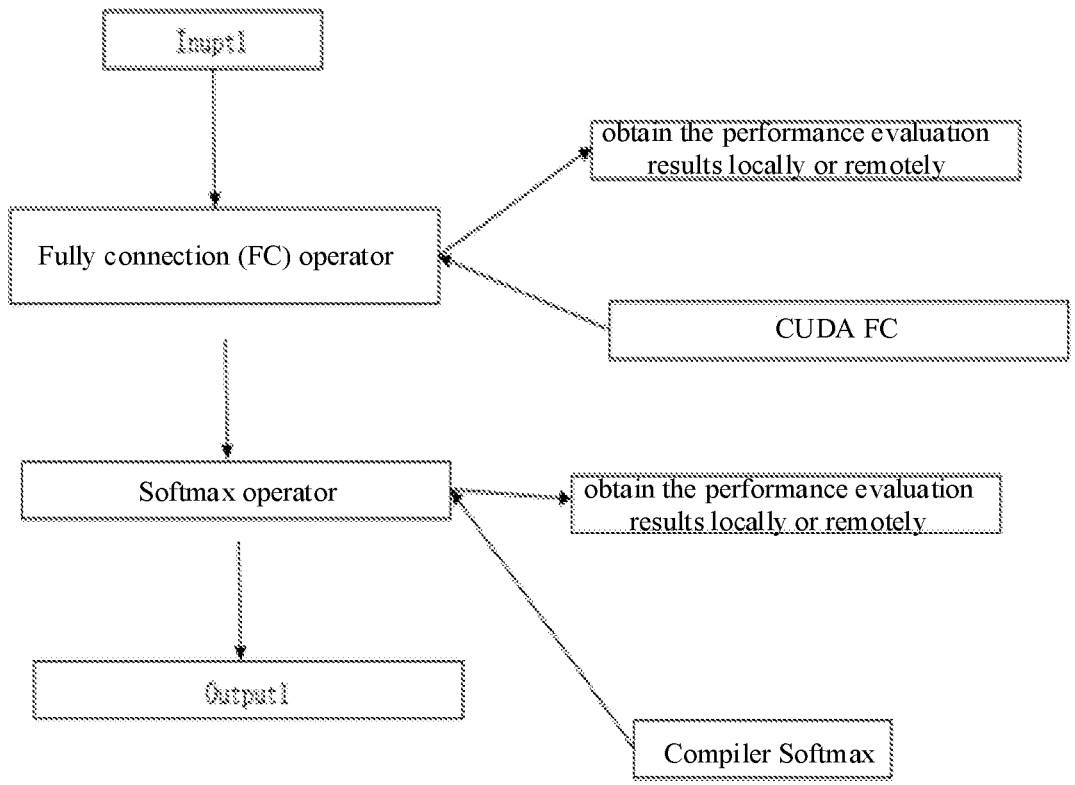
FIG. 13 is a schematic diagram of application of a method for processing data according to the disclosure.

As shown in FIG. 13, when the input data is input3, and the data shape of input3 is identical to that of input1, the accelerator library version of the computing device is selected CUDA. The corresponding operators of input3 include a FC operator and a Softmax operator. The performance test result can be obtained locally or remotely. When the performance test result is optional, the same operator implementation mode as input1 can be obtained directly, and the operation result output3 is output directly by the computing device.

Figure 14:
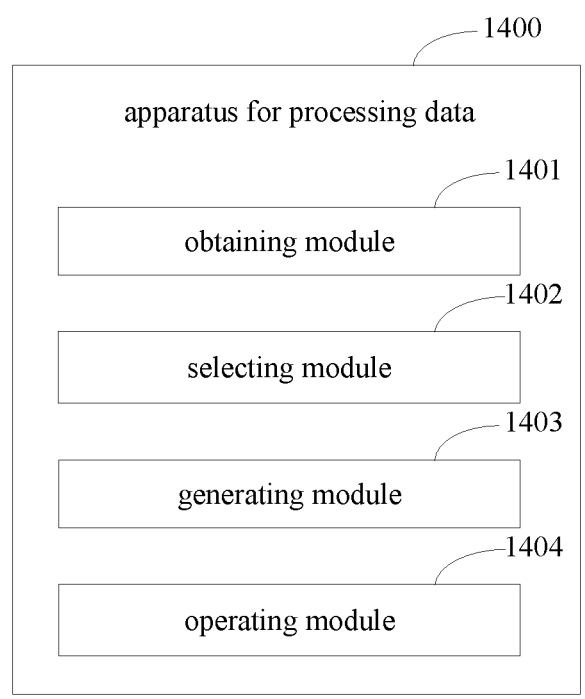
FIG. 14 is a block diagram of an apparatus for processing data used to implement the method for processing data according to the embodiments of the disclosure.

FIG. 14 shows an apparatus 1400 for processing data according to the disclosure. The apparatus includes: an obtaining module 1401, a selecting module 1402, a generating module 1403 and an operating module 1404.

The obtaining module 1401 is configured to obtain first attribute information of input data and second attribute information of a computing device corresponding to the input data.

The selecting module 1402 is configured to select a target operator implementation mode from a plurality of candidate operator implementation modes based on the first attribute information and the second attribute information.

The generating module 1403 is configured to determine a plurality of sub-operators included in an operator required for the input data from an operator library based on the target operator implementation mode, to generate the operator.

The operating module 1404 is configured to obtain an operation result by performing an operation on the input data by the computing device based on the operator.

The selecting module 1402 is further configured to:
perform a performance evaluation on the candidate operator implementation mode based on the first attribute information and the second attribute information, to obtain a corresponding performance evaluation result; and
select the target operator implementation mode from the plurality of candidate operator implementation modes based on the performance evaluation result.

The selecting module 1402 is further configured to:
obtain historical performance evaluation results corresponding to the candidate operator implementation mode of the operator; and
select a target performance evaluation result from the historical performance evaluation results as the performance evaluation result based on the first attribute information and the second attribute information.

The selecting module 1402 is further configured to:
obtain historical input data and historical computing devices based on the historical performance evaluation results; and
select a target performance evaluation result from the historical performance evaluation results as the performance evaluation result based on first attribute information of the historical input data in the historical performance evaluation results and the first attribute information of the input data, and second attribute information of the historical computing devices and the second attribute information of the computing device.

The selecting module 1402 is further configured to:
compare the first attribute information of the historical input data with the first attribute information of the input data;
compare the second attribute information of the historical computing devices with the second attribute information of the computing device; and
select the target performance evaluation result that is consistent with the first attribute information of the input data and the second attribute information of the computing device as the performance evaluation result from the historical performance evaluation results.

The selecting module 1402 is further configured to:
determine a candidate operator implementation mode corresponding to the performance evaluation result as the target operator implementation mode.

The selecting module 1402 is further configured to:
bond the performance evaluation result corresponding to the target operator implementation mode with the first attribute information and the second attribute information, and store as a new historical performance evaluation result.

The selecting module 1402 is further configured to:
obtain a performance preference selection strategy and determine the target performance indicator based on the performance preference selection strategy;
obtain an indicator evaluation result for the target performance indicator in the performance evaluation result; and
select the target operator implementation mode from the candidate operator implementation modes based on the indicator evaluation result.

The generating module 1403 is further configured to:
in response to the target operator implementation mode being the operator combination implementation mode, obtain the required operator, at least one first sub-operator included in the required operator and a combination sequence of the first sub-operators based on the first attribute information of the input data; and
combine the first sub-operators sequentially into the operator based on the combination sequence.

The generating module 1403 is further configured to:
in response to the target operator implementation mode being the operator compiler implementation mode, obtain the required operator, at least one second sub-operator included in the required operator and a compilation sequence of second sub-operators based on the first attribute information of the input data;
perform a tuning process on the second sub-operators, to obtain target second sub-operators after the tuning; and
perform a sequential compilation on the target second sub-operators based on the compilation sequence, to generate the operator.

The generating module 1403 is further configured to:
obtain a target tuning strategy and perform an operator fusion on the second sub-operators based on the target tuning strategy, to obtain fused sub-operator; and
perform an operator grouping and an operator scheduling on the fused sub-operator, to obtain the target second sub-operators.

The generating module 1403 is further configured to:
determine a data shape of the input data based on the first attribute information; and
obtain the corresponding target tuning strategy based on the data shape.

The operating module 1404 is further configured to:
generate a collection of operators of a deep neural network corresponding to the input data based on the operator of the input data; and
distribute the collection of operators to the computing device to build the deep neural network, and obtain the operation result by performing the operation on the input data by the deep neural network.

The operating module 1404 is further configured to:
monitor the operation, and stop the operation and generate an error log in response to detecting abnormality during the operation.

The operating module 1404 is further configured to:
schedule a new first computing device based on the second attribute information of the computing device, and obtain the operation result by performing the operation on the input data by the new first computing device based on the operator.

The operating module 1404 is further configured to:

schedule a new second computing device based on the first attribute information of the input data, obtain the second attribute information of the second computing device, and return to the step of selecting the target operator implementation mode from the candidate operator implementation modes based on the first attribute information and the second attribute information and subsequent steps.

The obtaining module 1401 is further configured to:

receive a data processing task and extract the input data from the data processing task, wherein the input data is one of image data, audio data or text data.

In conclusion, with the apparatus for processing data according to embodiments of the disclosure, the first attribute information of input data and the second attribute information of the computing device corresponding to the input data are obtained, the target operator implementation mode is selected from the plurality of candidate operator implementation modes based on the first attribute information and the second attribute information, and then the plurality of sub-operators included in the operator required for the input data are determined from the operator library based on the target operator implementation mode, to generate the operator, and finally, the operation result is obtained by performing the operation on the input data by the computing device based on the operator. In embodiments of the disclosure, the automatic scheduling of the operator implementation mode can be carried out based on the first attribute information of the input data and the second attribute information of the operation device, to give full play to the performance of the hardware by making full use of each operator implementation mode.

The collection, storage, use, processing, transmission, provision and disclosure of the user's personal information involved in the technical solution disclosed herein are handled in accordance with relevant laws and regulations, and do not violate public order and morality.

According to embodiments of the disclosure, the disclosure provides an electronic device, a readable storage medium and a computer program product.

Figure 15:
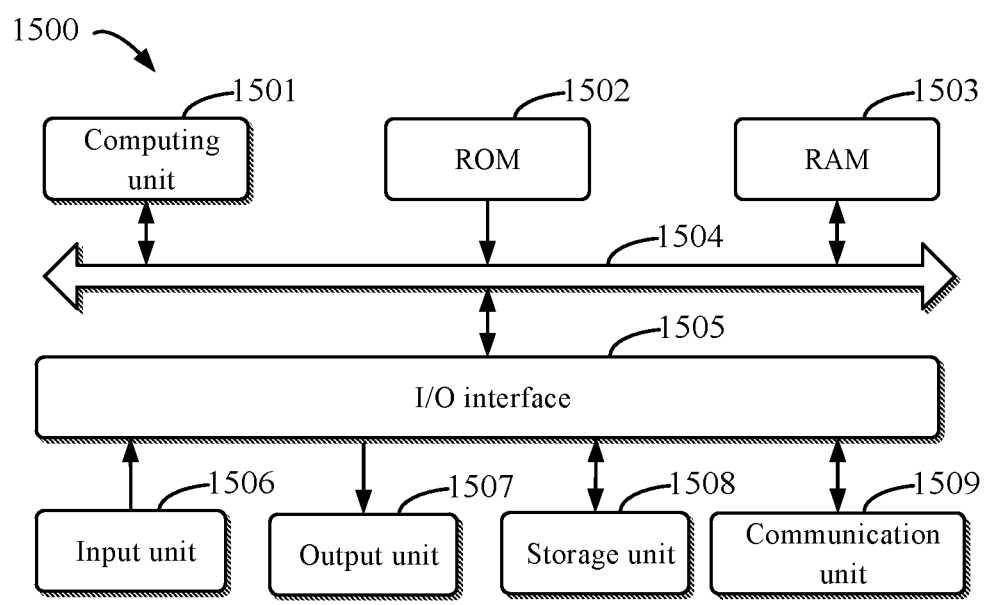
FIG. 15 is a block diagram of an electronic device used to implement the method for processing data according to the embodiments of the disclosure.

FIG. 15 is a block diagram of an example electronic device 1500 used to implement the embodiments of the disclosure. Electronic devices are intended to represent various forms of digital computers, such as laptop computers, desktop computers, workbenches, personal digital assistants, servers, blade servers, mainframe computers, and other suitable computers. Electronic devices may also represent various forms of mobile devices, such as personal digital processing, cellular phones, smart phones, wearable devices, and other similar computing devices. The components shown here, their connections and relations, and their functions are merely examples, and are not intended to limit the implementation of the disclosure described and/or required herein.

As illustrated in FIG. 15, the electronic device 1500 includes: a computing unit 1501 performing various appropriate actions and processes based on computer programs stored in a Read-Only Memory (ROM) 1502 or computer programs loaded from a storage unit 1508 to a Random Access Memory (RAM) 1503. In the RAM 1503, various programs and data required for the operation of the device 1500 are stored. The computing unit 1501, the ROM 1502, and the RAM 1503 are connected to each other through a bus 1504. An input/output (I/O) interface 1505 is also connected to the bus 1504.

Components in the device 1500 are connected to the I/O interface 1505, including: an inputting unit 1506, such as a keyboard, a mouse; an outputting unit 1507, such as various types of displays, speakers; a storage unit 1508, such as a disk, an optical disk; and a communication unit 1509, such as network cards, modems, and wireless communication transceivers. The communication unit 1509 allows the device 1500 to exchange information/data with other devices through a computer network such as the Internet and/or various telecommunication networks.

The computing unit 1501 may be various general-purpose and/or dedicated processing components with processing and computing capabilities. Some examples of computing unit 1501 include, but are not limited to, a CPU, a GPU, various dedicated AI computing chips, various computing units that run machine learning model algorithms, and a Digital Signal Processor (DSP), and any appropriate processor, controller and microcontroller. The computing unit 1501 executes the various methods and processes described above, such as the method for processing data in FIG. 1 to FIG. 13. For example, in some embodiments, the above method may be implemented as a computer software program, which is tangibly contained in a machine-readable medium, such as the storage unit 1508. In some embodiments, part or all of the computer program may be loaded and/or installed on the device 1500 via the ROM 1502 and/or the communication unit 1509. When the computer program is loaded on the RAM 1503 and executed by the computing unit 1501, one or more steps of the method described above may be executed. Alternatively, in other embodiments, the computing unit 1501 may be configured to perform the method in any other suitable manner (for example, by means of firmware).

Various implementations of the systems and techniques described above may be implemented by a digital electronic circuit system, an integrated circuit system, Field Programmable Gate Arrays (FPGAs), Application Specific Integrated Circuits (ASICs), Application Specific Standard Products (ASSPs), System on Chip (SOCs), Complex Programmable Logic Devices (CPLDs), computer hardware, firmware, software, and/or a combination thereof. These various embodiments may be implemented in one or more computer programs, the one or more computer programs may be executed and/or interpreted on a programmable system including at least one programmable processor, which may be a dedicated or general programmable processor for receiving data and instructions from the storage system, at least one input device and at least one output device, and transmitting the data and instructions to the storage system, the at least one input device and the at least one output device.

The program code configured to implement the method of the disclosure may be written in any combination of one or more programming languages. These program codes may be provided to the processors or controllers of general-purpose computers, dedicated computers, or other programmable data processing devices, so that the program codes, when executed by the processors or controllers, enable the functions/operations specified in the flowchart and/or block diagram to be implemented. The program code may be executed entirely on the machine, partly executed on the machine, partly executed on the machine and partly executed on the remote machine as an independent software package, or entirely executed on the remote machine or server.

In the context of the disclosure, a machine-readable medium may be a tangible medium that may contain or store a program for use by or in combination with an instruction execution system, apparatus, or device. The machine-readable medium may be a machine-readable signal medium or a machine-readable storage medium. A machine-readable medium may include, but is not limited to, an electronic, magnetic, optical, electromagnetic, infrared, or semiconductor system, apparatus, or device, or any suitable combination of the foregoing. More specific examples of machine-readable storage medium include electrical connections based on one or more wires, portable computer disks, hard disks, RAM, ROM, Electrically Programmable Read-Only-Memory (EPROM), flash memory, fiber optics, Compact Disc Read-Only Memories (CD-ROM), optical storage devices, magnetic storage devices, or any suitable combination of the foregoing.

In order to provide interaction with a user, the systems and techniques described herein may be implemented on a computer having a display device (e.g., a Cathode Ray Tube (CRT) or a Liquid Crystal Display (LCD) monitor for displaying information to a user); and a keyboard and pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, voice input, or tactile input).

The systems and technologies described herein can be implemented in a computing system that includes background components (for example, a data server), or a computing system that includes middleware components (for example, an application server), or a computing system that includes front-end components (for example, a user computer with a graphical user interface or a web browser, through which the user can interact with the implementation of the systems and technologies described herein), or include such background components, intermediate computing components, or any combination of front-end components. The components of the system may be interconnected by any form or medium of digital data communication (e.g., a communication network). Examples of communication networks include: Local Area Network (LAN), Wide Area Network (WAN), the Internet and the block-chain network.

The computer system may include a client and a server. The client and server are generally remote from each other and interacting through a communication network. The client-server relation is generated by computer programs running on the respective computers and having a client-server relation with each other. The server may be a cloud server, a server of a distributed system, or a server combined with a block-chain.

According to the embodiments of the disclosure, the disclosure provides a computer program product including computer programs. When the computer programs are executed by a processor, the method for processing data according to the above-described embodiments of the disclosure is implemented.

It should be understood that the various forms of processes shown above can be used to reorder, add or delete steps. For example, the steps described in the disclosure could be performed in parallel, sequentially, or in a different order, as long as the desired result of the technical solution disclosed in the disclosure is achieved, which is not limited herein.

The above specific embodiments do not constitute a limitation on the protection scope of the disclosure. Those skilled in the art should understand that various modifications, combinations, sub-combinations and substitutions can be made according to design requirement and other factors.

Any modification, equivalent replacement and improvement made within the spirit and principle of this application shall be included in the protection scope of this application.

What is claimed is:

1. A method for processing data, comprising:
    obtaining first attribute information of input data and second attribute information of a computing device corresponding to the input data;
    selecting a target operator implementation mode from a plurality of candidate operator implementation modes based on the first attribute information and the second attribute information;
    determining a plurality of sub-operators included in an operator required for the input data from an operator library based on the target operator implementation mode, to generate the operator; and
    obtaining an operation result by performing an operation on the input data by the computing device based on the operator,
    wherein selecting the target operator implementation mode from the plurality of candidate operator implementation modes based on the first attribute information and the second attribute information, comprises:
    performing a performance evaluation on the candidate operator implementation mode based on the first attribute information and the second attribute information, to obtain a corresponding performance evaluation result; and
    selecting the target operator implementation mode from the plurality of candidate operator implementation modes based on the performance evaluation result,
    wherein performing the performance evaluation on the candidate operator implementation mode based on the first attribute information and the second attribute information, to obtain the corresponding performance evaluation result, comprises:
    obtaining historical performance evaluation results corresponding to the candidate operator implementation mode of the operator; and
    selecting a target performance evaluation result from the historical performance evaluation results as the performance evaluation result based on the first attribute information and the second attribute information.

2. The method of claim 1, wherein selecting the target performance evaluation result from the historical performance evaluation results as the performance evaluation result based on the first attribute information and the second attribute information, comprises:
    obtaining historical input data and historical computing devices based on the historical performance evaluation results; and
    selecting a target performance evaluation result from the historical performance evaluation results as the performance evaluation result based on first attribute information of the historical input data in the historical performance evaluation results and the first attribute information of the input data, and second attribute information of the historical computing devices and the second attribute information of the computing device.

3. The method of claim 2, wherein selecting the target performance evaluation result from the historical performance evaluation results as the performance evaluation result based on the first attribute information of the historical input data in the historical performance evaluation results and the first attribute information of the input data, and the second attribute information of the historical computing devices and the second attribute information of the computing device, comprises:
  comparing the first attribute information of the historical input data with the first attribute information of the input data;
  comparing the second attribute information of the historical computing devices with the second attribute information of the computing device; and
  selecting the target performance evaluation result that is consistent with the first attribute information of the input data and the second attribute information of the computing device as the performance evaluation result from the historical performance evaluation results.

4. The method of claim 2, wherein selecting the target operator implementation mode from the plurality of candidate operator implementation modes based on the performance evaluation result, comprises:
  determining a candidate operator implementation mode corresponding to the performance evaluation result as the target operator implementation mode.

5. The method of claim 3, wherein performing the performance evaluation on the candidate operator implementation mode based on the first attribute information and the second attribute information, to obtain the corresponding performance evaluation result, comprises:
  in response to the historical performance evaluation results not comprising the target performance evaluation result, obtaining loss information of the candidate operator implementation mode based on the first attribute information, the second attribute information and the operator, and generating the performance evaluation result of the candidate operator implementation mode based on the loss information.

6. The method of claim 5, wherein after generating the performance evaluation result of the candidate operator implementation mode based on the loss information, the method further comprises:
  aggregating the performance evaluation result corresponding to the target operator implementation mode with the first attribute information and the second attribute information to form a new historical performance evaluation result, and storing the new historical performance evaluation result.

7. The method of claim 5, wherein the performance evaluation result comprises indicator evaluation results of a plurality of performance indicators, and selecting the target operator implementation mode from the candidate operator implementation modes based on the performance evaluation result, comprises:
  determining a target performance indicator for selecting the target operator implementation mode, wherein the target performance indicator is at least one of power consumption, video memory occupation and time consumption; and
  selecting the target operator implementation mode from the candidate operator implementation modes based on the target performance indicator and the performance evaluation result.

8. The method of claim 7, wherein selecting the target operator implementation mode from the candidate operator implementation modes based on the target performance indicator and the performance evaluation result, comprises:
  obtaining a performance preference selection strategy, and determining the target performance indicator based on the performance preference selection strategy, wherein the performance preference selection strategy refers to a strategy of selecting the target operator implementation mode based on an operation requirement; and
  in case that an indicator evaluation result corresponding to a candidate operator implementation mode comprises the target performance indicator, determining the candidate operator implementation mode as the target operator implementation mode.

9. The method of claim 1, wherein determining the plurality of sub-operators included in the operator required for the input data from the operator library based on the target operator implementation mode, to generate the operator, comprises:
  in response to the target operator implementation mode being an operator combination implementation mode, obtaining the required operator, at least one first sub-operator included in the required operator and a combination sequence of the first sub-operators based on the first attribute information of the input data; and
  combining the at least one first sub-operator sequentially into the operator based on the combination sequence.

10. The method of claim 1, wherein determining the plurality of sub-operators included in the operator required for the input data from the operator library based on the target operator implementation mode, to generate the operator, comprises:
  in response to the target operator implementation mode being an operator compiler implementation mode, obtaining the required operator, at least one second sub-operator included in the required operator and a compilation sequence of the second sub-operators based on the first attribute information of the input data;
  performing a tuning process on the second sub-operators, to obtain target second sub-operators after the tuning; and
  performing a sequential compilation on the target second sub-operators based on the compilation sequence, to generate the operator.

11. The method of claim 10, wherein performing the tuning process on the second sub-operators, to obtain the target second sub-operators after the tuning, comprises:
  obtaining a target tuning strategy and performing an operator fusion on the second sub-operators based on the target tuning strategy, to obtain a fused sub-operator; and
  performing an operator grouping and an operator scheduling on the fused sub-operator, to obtain the target second sub-operators.

12. The method of claim 11, wherein obtaining the target tuning strategy comprises:
  determining a data shape of the input data based on the first attribute information; and
  obtaining the corresponding target tuning strategy based on the data shape.

13. The method of claim 1, wherein obtaining the operation result by performing the operation on the input data by the computing device based on the operator, comprises:
  generating a collection of operators of a deep neural network corresponding to the input data based on the operator of the input data; and
  distributing the collection of operators to the computing device to build the deep neural network, and obtaining the operation result by performing the operation on the input data by the deep neural network.

14. The method of claim 1, wherein obtaining the operation result by performing the operation on the input data by the computing device based on the operator, comprises:

monitoring the operation;

and stopping the operation and generating an error log in response to detecting abnormality during the operation.

15. The method of claim 14, further comprising:
in response to detecting abnormality during the operation, scheduling a new first computing device based on the second attribute information of the computing device; and
obtaining the operation result by performing the operation on the input data by the new first computing device based on the operator.

16. The method of claim 14, further comprising:
in response to detecting abnormality during the operation, scheduling a new second computing device based on the first attribute information of the input data;
obtaining the second attribute information of the second computing device; and
returning to the step of selecting the target operator implementation mode from the candidate operator implementation modes based on the first attribute information and the second attribute information and subsequent steps.

17. The method of claim 1, wherein before obtaining the first attribute information of the input data, the method further comprises:
receiving a data processing task and extracting the input data from the data processing task, wherein the input data is one of image data, audio data or text data.

18. An electronic device, comprising:
at least one processor; and
a memory communicatively coupled to the at least one processor; wherein,
the memory stores instructions executable by the at least one processor, when the instructions are executed by the at least one processor, the at least one processor is caused to:
obtain first attribute information of input data and second attribute information of a computing device corresponding to the input data;

select a target operator implementation mode from a plurality of candidate operator implementation modes based on the first attribute information and the second attribute information;

determine a plurality of sub-operators included in an operator required for the input data from an operator library based on the target operator implementation mode, to generate the operator; and obtain an operation result by performing an operation on the input data by the computing device based on the operator, wherein selecting the target operator implementation mode from the plurality of candidate operator implementation modes based on the first attribute information and the second attribute information, comprises:

performing a performance evaluation on the candidate operator implementation mode based on the first attribute information and the second attribute information, to obtain a corresponding performance evaluation result; and selecting the target operator implementation mode from the plurality of candidate operator implementation modes based on the performance evaluation result, wherein performing the performance evaluation on the candidate operator implementation mode based on the first attribute information and the second attribute information, to obtain the corresponding performance evaluation result, comprises:

obtaining historical performance evaluation results corresponding to the candidate operator implementation mode of the operator; and selecting a target performance evaluation result from the historical performance evaluation results as the performance evaluation result based on the first attribute information and the second attribute information.

* * * * *